US010372591B2

United States Patent
Kochura et al.

(10) Patent No.: US 10,372,591 B2
(45) Date of Patent: Aug. 6, 2019

(54) APPLYING EYE TRACKERS MONITORING FOR EFFECTIVE EXPLORATORY USER INTERFACE TESTING

(71) Applicant: International Business Machines Corporation, Armonk, NY (US)

(72) Inventors: Nadiya Kochura, Bolton, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 15/258,350

(22) Filed: Sep. 7, 2016

(65) Prior Publication Data

US 2018/0067842 A1    Mar. 8, 2018

(51) Int. Cl.
G06F 9/44 (2018.01)
G06F 11/36 (2006.01)
G06F 3/01 (2006.01)

(52) U.S. Cl.
CPC .......... *G06F 11/3676* (2013.01); *G06F 3/013* (2013.01); *G06F 11/3664* (2013.01); *G06F 11/3684* (2013.01); *G06F 11/3692* (2013.01)

(58) Field of Classification Search
None
See application file for complete search history.

(56) References Cited

U.S. PATENT DOCUMENTS

| | | |
|---|---|---|
| 3,712,716 A | 1/1973 | Cornsweet et al. |
| 4,950,069 A | 8/1990 | Hutchinson |
| 5,589,619 A | 12/1996 | Chappell et al. |
| 5,818,954 A | 10/1998 | Tomono et al. |
| 5,861,940 A | 1/1999 | Robinson et al. |
| 6,079,828 A | 6/2000 | Fujieda |
| 6,106,119 A | 8/2000 | Edwards |
| 6,152,563 A | 11/2000 | Hutchinson et al. |
| 6,437,758 B1 * | 8/2002 | Nielsen ................ G06F 3/013 345/7 |
| 8,381,188 B2 | 2/2013 | John et al. |
| 2004/0227699 A1 | 11/2004 | Mitchell |
| 2006/0238707 A1 | 10/2006 | Elvesjo et al. |
| 2007/0164990 A1 | 7/2007 | Bjorklund et al. |

(Continued)

FOREIGN PATENT DOCUMENTS

| | | |
|---|---|---|
| WO | 2010118292 A1 | 10/2010 |
| WO | 2015170142 A1 | 11/2015 |

*Primary Examiner* — Qamrun Nahar
(74) *Attorney, Agent, or Firm* — Pepper Hamilton LLP

(57) ABSTRACT

Embodiments are directed to analyzing eye tracking data collected from an end user to identify user attention and focus areas in user interface (UI) application screens. These areas can be extracted and mapped to a concrete UI component or particular UI object on the display, such as a column or row in a displayed table. Analyzed collected eye tracking data are reflected back to the UI testing, providing information for additional test cases. The test data indicates how the user interacts with the system to determine if desired conditions are achieved. By capturing the user attention areas on the application UI and identifying shifts in user attention based on the displayed data, methods disclosed herein provide a valuable input to the automated test cases, greatly increasing test covering and more accurately mimicking the user application interaction and experience.

15 Claims, 4 Drawing Sheets

(56) References Cited

U.S. PATENT DOCUMENTS

| | | |
|---|---|---|
| 2008/0284980 A1 | 11/2008 | Skogo et al. |
| 2014/0049452 A1 | 2/2014 | Maltz |
| 2014/0181910 A1* | 6/2014 | Fingal .................. H04L 63/105 726/4 |
| 2014/0303756 A1 | 10/2014 | Tarnutzer et al. |
| 2015/0339019 A1* | 11/2015 | Ledenev ............. G06F 11/3676 715/772 |
| 2016/0103756 A1 | 4/2016 | McClung et al. |

* cited by examiner

APPLYING EYE TRACKERS MONITORING FOR EFFECTIVE EXPLORATORY USER INTERFACE TESTING

BACKGROUND

Graphical user interface (GUI) testing is performed to determine factors related to a user's experience utilizing a GUI (e.g., usability and coverage). GUI testing faces a myriad of obstacles due to difficulty in automating the testing because of the interactive nature of a user and application interaction. For example, even the seemingly simple task of determining coverage criteria of a GUI faces complications because traditional code-based coverage criteria do not necessarily apply in this domain. Another challenge is that the amount of test cases grows too large for a large system, increasing the difficulty to manage and maintain. Simply to run the test cases takes an enormous amount of time and system resources (e.g., memory and processing), making the GUI testing process cumbersome and inefficient.

Thus, there is a need for improved GUI testing functionality.

SUMMARY

Embodiments are directed to utilizing eye-gazing technology to determine a user's focus area on a graphical user interface (GUI). Collected eye-gazing data is used to ensure test cases for GUI widgets are covered.

According to embodiments, a computer-implemented method, system, and computer program product are provided for utilizing eye tracking information for user interface (UI) element analysis and testing. The system includes one or more eye-gazing tracking enabled devices and a processor coupled to the one or more eye-gazing tracking enabled devices. The computer program product comprises a computer readable storage medium having program instructions embodied therewith, the program instructions executable by a processor. The processors are configured to implement the computer-implemented method of receiving, from an eye-gazing tracking enabled device, eye tracking data information including one or more of eye tracking focus, time, and path from a user utilizing UI elements of an application on the eye-gazing tracking enabled device to form a usage history of the UI elements; analyzing the usage history of the UI elements to determine a UI coverage for the application; comparing the UI coverage for the application to a UI testing coverage criteria to form a testing coverage assessment; and reporting the testing coverage assessment.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
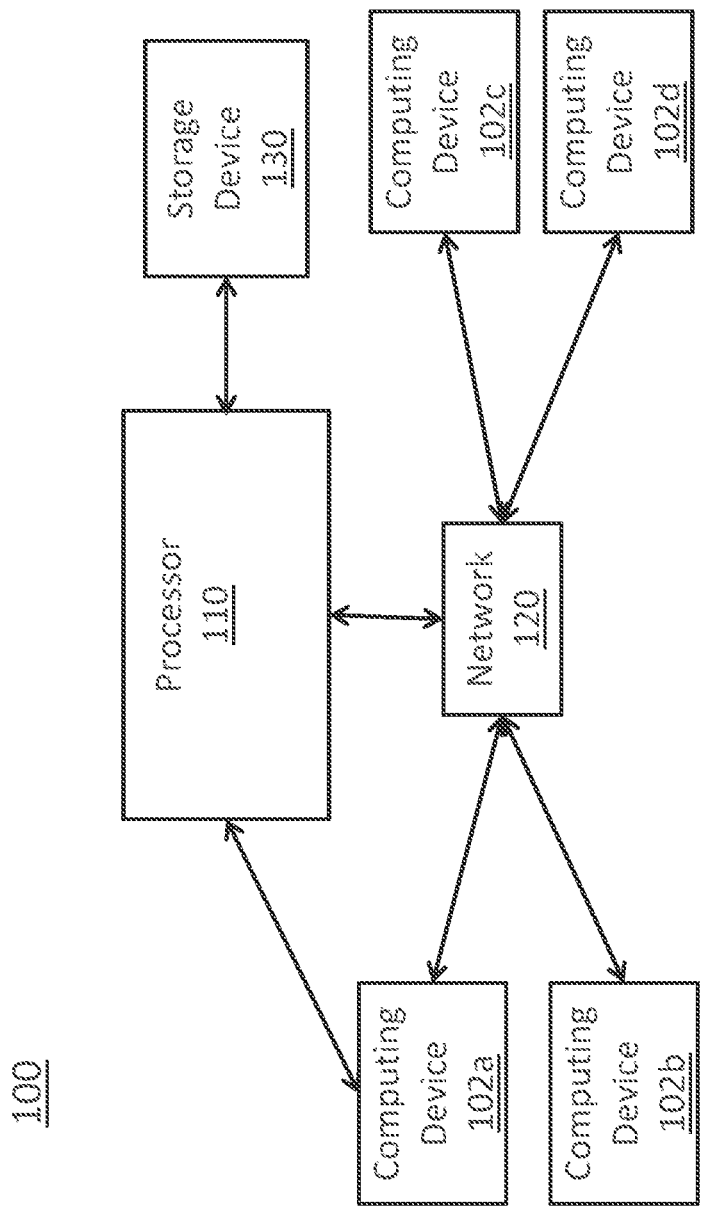
FIG. 1 is a diagram depicting a system for utilizing eye tracking information for user interface (UI) element analysis and testing, according to embodiments herein.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

According to embodiments disclosed herein, eye-gazing technology is utilized to determine a user's focus area on a graphical user interface (GUI) (also referred to herein as simply a user interface (UI)). Collected user data is integrated into a software user interface automation process to ensure necessary test cases for GUI widgets are covered. Additionally, the length of eye focus data is used to determine areas more frequently used than other areas. As a result, frequently used widgets are identified and determined to require additional stress testing.

Additionally, according to embodiments disclosed herein, by analyzing collected eye tracking data, additional UI testing cases are generated by, for example, expanding testing coverage for more important UI components, adjusting test coverage for less important UI components, adjusting a testing dataset by expanding and providing additional data type, and identifying a shift of the user focus areas between displayed UI components and then following up UI actions. According to embodiments disclosed herein, importance of UI components is based on length of time of eye focus data on the UI components. Other criteria may also be used.

According to embodiments herein, known eye-gazing technology is utilized. Gaze-tracking devices may be used to determine an area of a UI of most interest to a user. A processing device may determine an aspect of operation of an application that has a user's interest, which may be optimized using gaze tracking devices. A UI and calibration method may be utilized for controlling an eye gaze controlled device. The following patent documents provide details relating to eye-gazing technology that may be used with embodiments provided herein: U.S. Pat. Nos. 3,712, 716; 4,950,069; 5,589,619; 5,818,954; 5,861,940; 6,079, 828; 6,106,119; 6,152,563; and 6,437,758; U.S. Patent Application Publication Nos. 2006/0238707; 2007/ 0164990; 2008/0284980; and 2014/0049452; and International Publication Nos. WO 2010118292 A1; and WO 2015170142 A1. The contents of each of these documents are incorporated by reference in their entirety herein.

FIG. 1 is a diagram depicting a system 100 for utilizing eye tracking information for user interface (UI) element analysis and testing. In an embodiment, the system 100 comprises a user acceptance testing (UAT) environment. The system 100 includes a processor 110 coupled directly or via a network 120 to various computing devices 102a, 102b, 102c, and 102d. Each device 102a, 102b, 102c, and 102d is an eye-gazing tracking enabled device; additional or fewer devices 102 may be included in the system 100. A storage device 130 coupled to the processor 110 is also provided in the system 100. The storage device 130 receives and stores information related to eye tracking information and UI testing.

According to an embodiment, eye tracking data from one of the devices 102a, 102b, 102c, and 102d is transmitted to and received by the processor 110. The eye tracking data may include one or more of eye tracking focus, time, and path from a user utilizing UI elements of an application running on the eye-gazing tracking enabled device 102. The eye tracking data is used to form a usage history of the UI elements.

The processor 110 analyzes the usage history of the UI elements to determine a UI coverage for the application. The UI coverage indicates portions or areas of the UI that are used more frequently than other areas. The UI coverage may be based on, according to an embodiment, length or time of eye focus data. The UI coverage may be used to identify frequently used widgets or other components of the UI, which may be used to determine additional areas for testing.

The processor 110 compares the UI coverage for the application to a UI testing coverage criteria to form a testing coverage assessment, which is reported by the processor. The testing coverage assessment is an indicator of how the testing should be adapted or updated for a particular user. For example, the testing coverage assessment may indicate the test cases to be created based on user interaction or based on user eye focus.

Thus, according to embodiments herein, eye tracking data collected from an end user is utilized. The eye tracking data is analyzed and used to identify the user attention and focus areas in the UI application screens. These data help to identify the most as well as the least important UI widgets and components. In addition, these data help to identify the most important data fields within all of the displayed data content.

Analyzed collected eye tracking data are used to identify the focus and UI attention areas of the users. These areas can be extracted and mapped to the concrete UI component or particular UI object on the display, such as a column or row in a displayed table.

Analyzed collected eye tracking data are reflected back to the UI testing, providing information for additional test cases, including, for example: expanding testing coverage for more important UI components, adjusting the test coverage for UI components less important to the end user, adjusting the testing dataset by expanding and providing additional data types, and identifying the shift of the user focus areas between displayed UI components and then to the follow-up UI actions which is helpful to build additional test cases.

Figure 2:
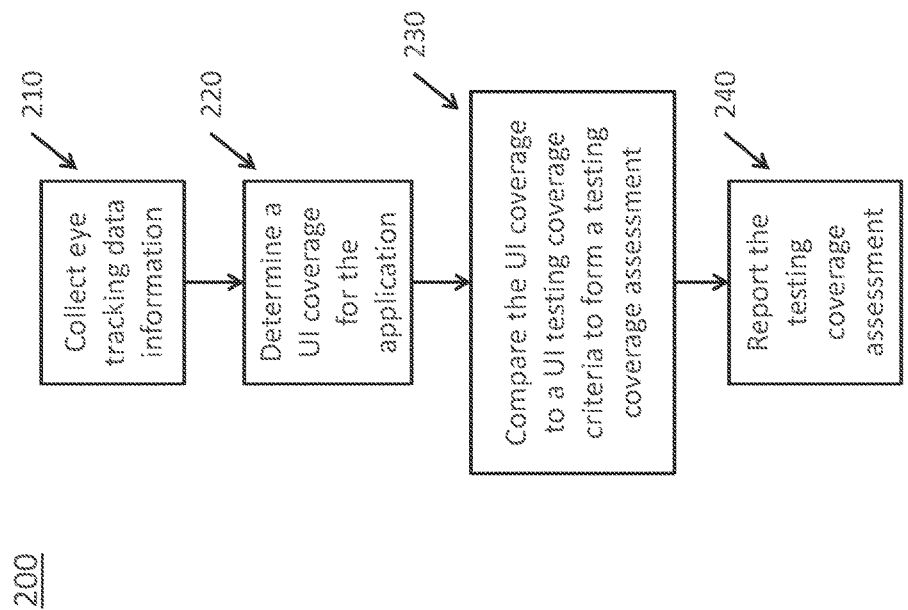
FIG. 2 is a flowchart illustrating a method of utilizing eye tracking information for user interface (UI) element analysis and testing, according to embodiments herein.

FIG. 2 is a flowchart 200 illustrating a method of utilizing eye tracking information for UI element analysis and testing, according to embodiments herein.

At 210, eye tracking data information is received by the processor 110 from an eye-gazing tracking enabled device 102. The eye tracking data information may include but is not limited to one or more of eye tracking focus, time, and path from a user utilizing UI elements of an application on the eye-gazing tracking enabled device 102. The eye tracking data, in an embodiment, is used to form a usage history of the UI elements of the application.

At 220, the processor 110 analyzes the usage history of the UI elements to determine a UI coverage for the application.

At 230, the processor 110 compares the UI coverage for the application to a UI testing coverage criteria to form a testing coverage assessment. In an embodiment, the testing coverage assessment identifies aspects of the UI elements of testing comprising one or more of not tested, stress testing recommended, reduced testing recommended, UI elements change, and UI elements reorganize.

At 240, the processor 110 reports the testing coverage assessment, which is used to develop or update further tests.

Figure 3:
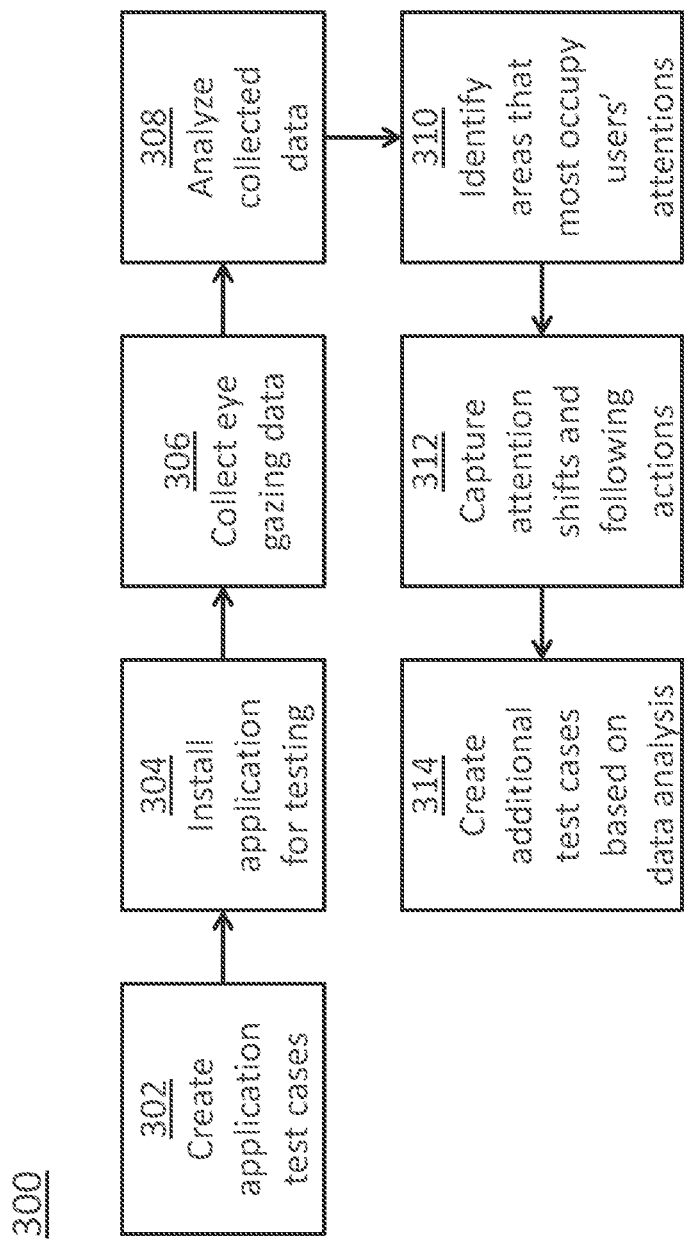
FIG. 3 is a flowchart illustrating a method of creating and implementing test cases for UIs based on eye tracking information, according to an additional embodiment.

FIG. 3 is a flowchart 300 illustrating a method of creating and implementing test cases for UIs based on eye tracking information, according to an additional embodiment.

At 302, application test cases are created. At 304, an application is installed and available for testing at a user acceptance testing (UAT) environment such as at devices 102 of the system 100. At 306, eye gazing data are collected from various application users, with various levels of users including novice and experts. At 308, collected data are analyzed, with high attention components identified in each GUI display of the application. At 310, areas of the displayed data that occupy more of the users' attentions are identified. At 312, attention shifts between UI displayed object and following UI actions are captured. And at 314, additional test cases are created mimicking the user interaction with application GUI based on the identified user focus areas.

The methods according to embodiments provided herein helps to optimize the test cases for GUI applications and improve test coverage. Test cases more accurately mimic user interaction with the system.

In an example use case, an application UI screen contains data that a customer looks at and analyzes before making a decision. For example, the application UI screen may include a list of product characteristics including comparison data with other similar products. The customer's eye tracking data may show that the focus is mostly on the areas where similar products are listed with the links to these products and certain product features. However, in an example, the UI widget for displaying these data is very narrow, and when the user tries to access the links for displaying the comparable features, the application frequently times-out. The method according to embodiments herein functions may be collecting and analyzing the eye tracking data, providing feedback for UI usability, stress, and concurrency testing. Additional test cases may be, according to embodiments provided herein, created to test an identified high attention UI component. Stress and multiuser tests may be added. Additional type of test data include large text descriptions of the features.

In another example use case, a correlation between user attention and a dataset is established, according to embodiments disclosed herein. A financial application GUI displays a grid format of data with many details relating to portfolio securities. Captured eye tracker data show that most of the time user attention is on a column that displays details on a current market value (MV) of the securities. Following up is the action on the data grid filter. However, the filtering data action invokes a recalculation of the MV and the grid refresh causes application concurrency errors resulting in the wrong MV calculation. According to embodiments herein, the eye tracker data are analyzed and additional test cases are implemented, such as, for example: test cases for testing filter options applied to the grid with only few securities details; extended test dataset to add all the varieties of interested MV field; and added stress and concurrency tests for calculating and updating the MV field.

By utilizing analyzed eye tracking data such as eye gaze direction and eye focus areas, methods disclosed herein optimize the UI testing process and make the UI testing process more efficient. The idea behind test automation is mimicking what a user can do using the GUI, and test data indicates how the user interacts with the system to determine if the desired conditions are achieved. By capturing the user attention areas on the application UI and identifying shifts in user attention based on the displayed data, methods disclosed herein provide a valuable input to the automated test cases, greatly increasing test covering and more accurately mimicking the user application interaction and experience.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
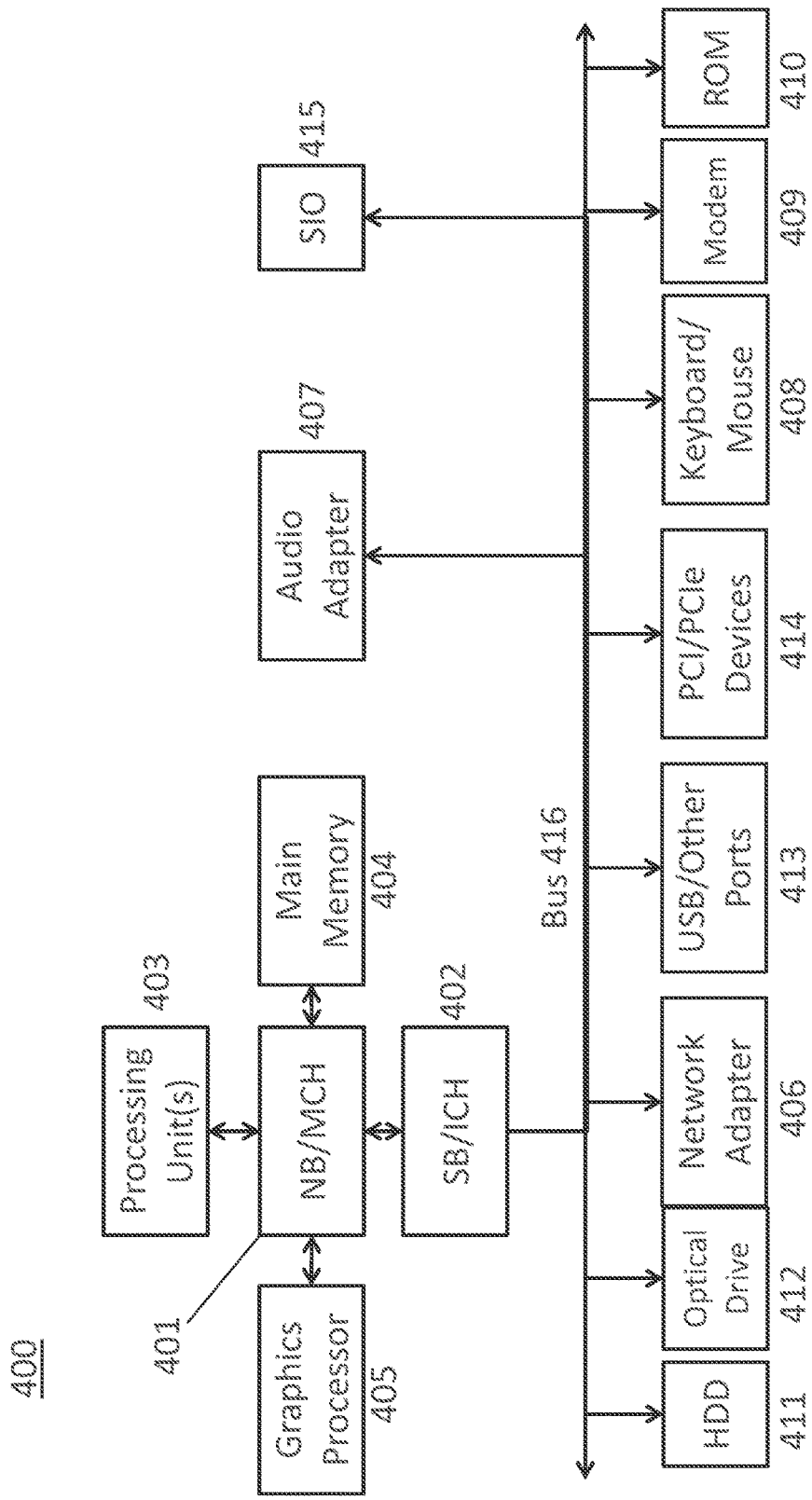
FIG. 4 is a block diagram of an example data processing system in which aspects of the illustrative embodiments may be implemented.

FIG. 4 is a block diagram of an example data processing system 400 in which aspects of the illustrative embodiments are implemented. Data processing system 400 is an example of a computer, such as a server or client, in which computer usable code or instructions implementing the process for illustrative embodiments of the present invention are located. In one embodiment, FIG. 4 may represent a server computing device.

In the depicted example, data processing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH 401 through, for example, an accelerated graphics port (AGP).

In the depicted example, a network adapter 406 connects to the SB/ICH 402. An audio adapter 407, keyboard and mouse adapter 408, modem 409, read only memory (ROM) 410, hard disk drive (HDD) 411, optical drive (e.g., CD or DVD) 412, universal serial bus (USB) ports and other communication ports 413, and PCI/PCIe devices 414 may connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or serial advanced technology attachment (SATA) interface. A super I/O (SIO) device 415 can be connected to the SB/ICH 402.

An operating system can run on processing unit 403. The operating system can coordinate and provide control of various components within the data processing system 400. As a client, the operating system can be a commercially available operating system. An object-oriented programming system, such as the Java™ programming system, may run in conjunction with the operating system and provide calls to the operating system from the object-oriented programs or applications executing on the data processing system 400. As a server, the data processing system 400 can be an IBM® eServer™ System P® running the Advanced Interactive Executive operating system or the Linux operating system. The data processing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments described herein can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or the network adapter 406 can include one or more devices that can be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 400 can take the form of any of a number of different data processing systems, including but not limited to, client computing devices, server computing devices, tablet computers, laptop computers, telephone or other communication devices, personal digital assistants, and the like. Essentially, data processing system 400 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer-implemented method for utilizing eye tracking information for user interface (UI) element analysis and testing, the method comprising:
   receiving, by a processor from an eye-gazing tracking enabled device, eye tracking data information including one or more of eye tracking focus, time, and path from a user utilizing UI elements of an application on the eye-gazing tracking enabled device to form a usage history of the UI elements, wherein the eye tracking data information is received from a plurality of users from corresponding ones of a plurality of eye-gazing tracking enabled devices, and the plurality of users comprise various levels of expertise, wherein the UI testing coverage criteria is based on a particular level of expertise;

analyzing, by the processor, the usage history of the UI elements to determine a UI coverage for the application;

comparing, by the processor, the UI coverage for the application to a UI testing coverage criteria to form a testing coverage assessment; and reporting, by the processor, the testing coverage assessment.

2. The method of claim 1, wherein the testing coverage assessment identifies aspects of the UI elements of testing comprising one or more of not tested, stress testing recommended, reduced testing recommended, UI elements change, and UI elements reorganize.

3. The method of claim 1, wherein the testing coverage assessment identifies new test cases to be created based on the eye tracking data information.

4. The method of claim 1, wherein the UI coverage comprises one or more of high attention components of the UI elements, attention shifts between the UI elements, and follow-up actions by the user.

5. The method of claim 4, further comprising:

creating, by the processor, additional test cases mimicking user interaction with the UI elements of the application based on the UI coverage.

6. A system for utilizing eye tracking information for user interface (UI) element analysis and testing, the system comprising:

one or more eye-gazing tracking enabled devices; and a processor coupled to the one or more eye-gazing tracking enabled devices, the processor configured to:

receive from a first of the one or more eye-gazing tracking enabled devices eye tracking data information including one or more of eye tracking focus, time, and path from a user utilizing UI elements of an application on the first eye-gazing tracking enabled device to form a usage history of the UI elements, wherein the eye tracking data information is received from a plurality of users from corresponding ones of the one or more eye-gazing tracking enabled devices, and the plurality of users comprise various levels of expertise, wherein the UI testing coverage criteria is based on a particular level of expertise;

analyze the usage history of the UI elements to determine a UI coverage for the application;

compare the UI coverage for the application to a UI testing coverage criteria to form a testing coverage assessment; and report the testing coverage assessment.

7. The system of claim 6, wherein the testing coverage assessment identifies aspects of the UI elements of testing comprising one or more of not tested, stress testing recommended, reduced testing recommended, UI elements change, and UI elements reorganize.

8. The system of claim 6, wherein the testing coverage assessment identifies new test cases to be created based on the eye tracking data information.

9. The system of claim 6, wherein the UI coverage comprises one or more of high attention components of the UI elements, attention shifts between the UI elements, and follow-up actions by the user.

10. The system of claim 9, wherein the processor is further configured to:

create additional test cases mimicking user interaction with the UI elements of the application based on the UI coverage.

11. A computer program product for utilizing eye tracking information for user interface (UI) element analysis and testing, the computer program product comprising a computer readable storage medium having program instructions embodied therewith, the program instructions executable by a processor to cause the processor to:

receive, from an eye-gazing tracking enabled device, eye tracking data information including one or more of eye tracking focus, time, and path from a user utilizing UI elements of an application on the eye-gazing tracking enabled device to form a usage history of the UI elements, wherein the eye tracking data information is received from a plurality of users from corresponding ones of a plurality of eye-gazing tracking enabled devices, wherein the plurality of users comprise various levels of expertise, wherein the UI testing coverage criteria is based on a particular level of expertise;

analyze the usage history of the UI elements to determine a UI coverage for the application;

compare the UI coverage for the application to a UI testing coverage criteria to form a testing coverage assessment; and report the testing coverage assessment.

12. The computer program product of claim 11, wherein the testing coverage assessment identifies aspects of the UI elements of testing comprising one or more of not tested, stress testing recommended, reduced testing recommended, UI elements change, and UI elements reorganize.

13. The computer program product of claim 11, wherein the testing coverage assessment identifies new test cases to be created based on the eye tracking data information.

14. The computer program product of claim 11, wherein the UI coverage comprises one or more of high attention components of the UI elements, attention shifts between the UI elements, and follow-up actions by the user.

15. The computer program product of claim 14, wherein the program instructions further cause the processor to:

create additional test cases mimicking user interaction with the UI elements of the application based on the UI coverage.

* * * * *